(12) United States Patent
Moran et al.

(10) Patent No.: US 9,766,913 B2
(45) Date of Patent: Sep. 19, 2017

(54) METHOD AND SYSTEM FOR MANAGING PERIPHERAL DEVICES FOR VIRTUAL DESKTOPS

(71) Applicant: Citrix Systems, Inc., Fort Lauderdale, FL (US)

(72) Inventors: Robert James Moran, Cambridge (GB); Zoe Carol Moran, Cambridge (GB); Christopher Stephen Smyth, Bedford (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 505 days.

(21) Appl. No.: 14/292,683

(22) Filed: May 30, 2014

(65) Prior Publication Data

US 2015/0346931 A1    Dec. 3, 2015

(51) Int. Cl.
*G06F 9/455*      (2006.01)
*G06F 3/0484*     (2013.01)
*G06F 3/0488*     (2013.01)
*G06F 3/0486*     (2013.01)
*G06F 9/50*       (2006.01)

(52) U.S. Cl.
CPC ........ *G06F 9/45533* (2013.01); *G06F 3/0484* (2013.01); *G06F 3/0486* (2013.01); *G06F 3/0488* (2013.01); *G06F 9/45558* (2013.01); *G06F 9/5077* (2013.01)

(58) Field of Classification Search
CPC .......................... G06F 9/45533; G06F 9/45558
See application file for complete search history.

(56) References Cited

U.S. PATENT DOCUMENTS

2011/0131573 A1\* 6/2011 Antony .................. G06F 3/023
                                                    718/1
2012/0081355 A1   4/2012 Post et al.
(Continued)

OTHER PUBLICATIONS

Screen Shot of XenClient XT Product; Citrix Systems, Inc.; Apr. 17, 2014.
(Continued)

*Primary Examiner* — William Bashore
*Assistant Examiner* — Nathan Shrewsbury
(74) *Attorney, Agent, or Firm* — Foley & Lardner LLP; Christopher J. McKenna

(57) ABSTRACT

An electronic device is provided for managing assignment of peripheral devices in a virtualization environment. The electronic device can include a user interface configured to display one or more representations of virtual desktops. The virtual desktops are associated with corresponding virtual machines. The electronic devices can also include one or more processors configured to provide to the user interface to display one or more representations of the peripheral devices based on detection that the peripheral devices are communicatively coupled to a control virtual machine of the virtualization environment. The one or more processors can be further configured to detect one or more first inputs received with respect to the one or more representations of the virtual desktops and the one or more representations of the peripheral devices; and facilitate to establish one or more associations between the peripheral devices and the virtual machines.

30 Claims, 11 Drawing Sheets

(56) References Cited

U.S. PATENT DOCUMENTS

2012/0167094 A1\* 6/2012 Suit .................... G06F 11/3452
                                                         718/100
2014/0089538 A1\* 3/2014 Bachrany ................. G06F 3/00
                                                         710/37
2014/0130041 A1  5/2014 Luxenberg et al.

OTHER PUBLICATIONS

Screen Shot of XenClient Enterprise Product; Citrix Systems, Inc.; Apr. 17, 2014.
PCT International Search Report and Written Opinion mailed Feb. 5, 2015; PCT Application No. PCT/US2014/046038; 10 pages; (10 pages).
Jin, Hai et al.; "ChinaV: Building Virtualized Computing System"; The 10th IEEE International Conference on High Performance Computing and Communications; Sep. 25, 2008; pp. 21-35.
Lee, Yuan-Cheng et al.; "F-VT: A Friendly Virtualization Framework"; 2012 9th International Conference on Ubiquitous Intelligence and Computing and 9th International Conference on Autonomic and Trusted Computing; Sep. 4, 2012; pp. 845-850.
Liao, Xiaofei et al.; "Sharing Virtual USB Device in Virtualized Desktop"; 2011 Fourth International Symposium on Parallel Architectures, Algorithms and Programming; Dec. 9, 2011; pp. 156-160.

\* cited by examiner

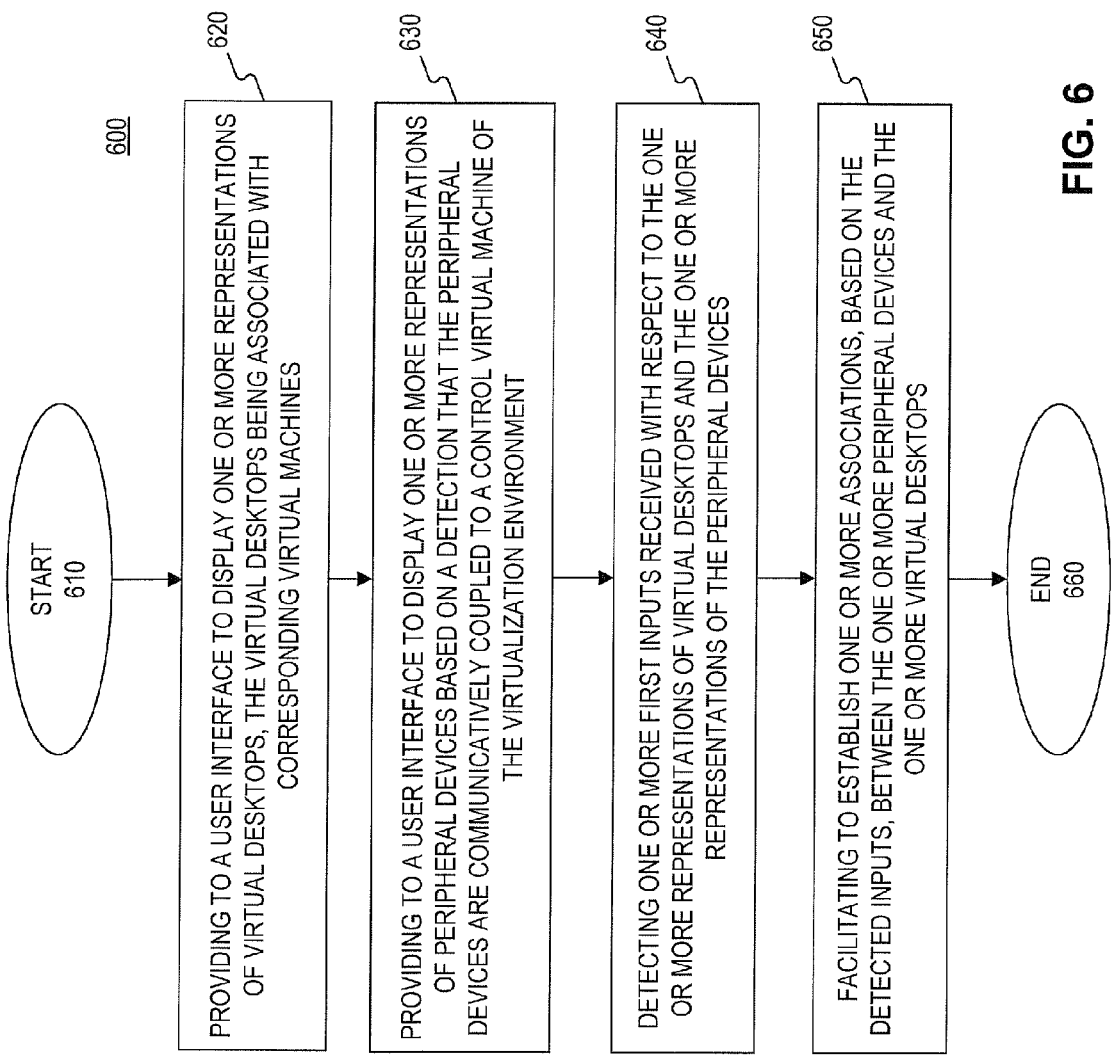

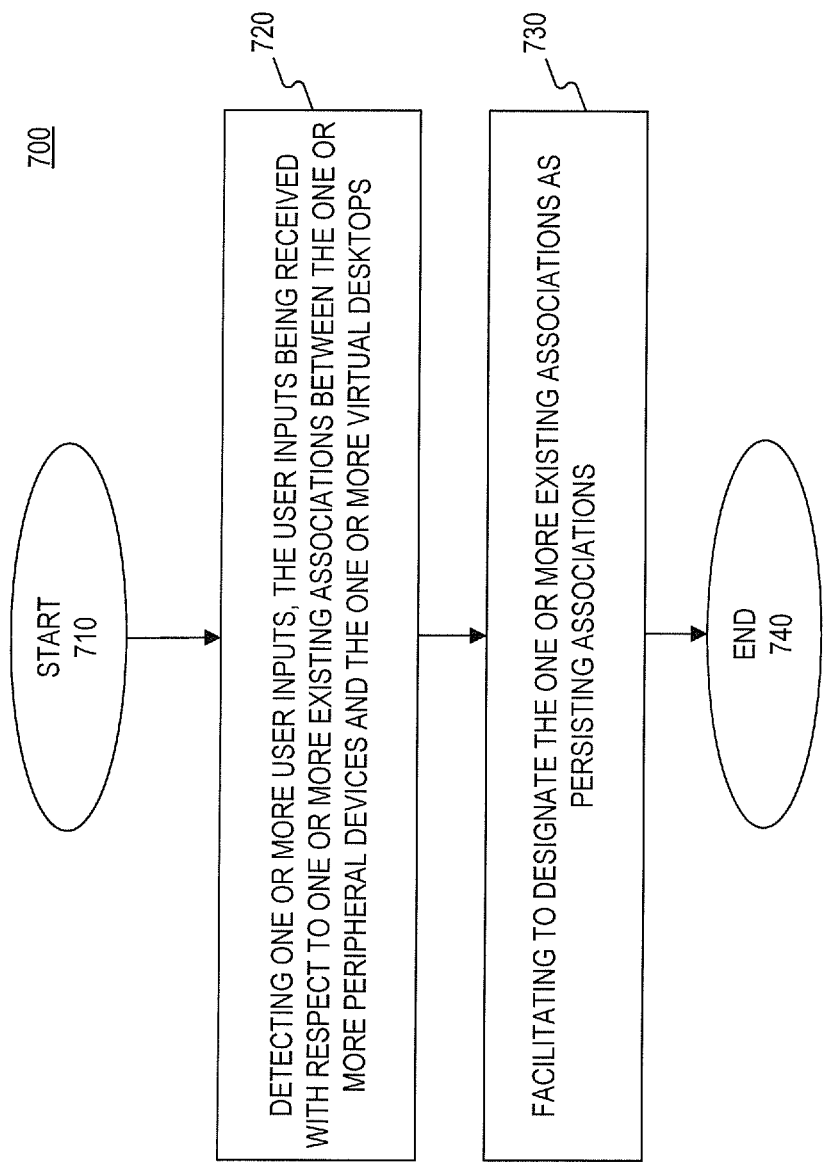

METHOD AND SYSTEM FOR MANAGING PERIPHERAL DEVICES FOR VIRTUAL DESKTOPS

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running a Microsoft Windows™ operating system may host a virtual machine that simulates a computer running a Linux operating system, based on which Linux-based software can be executed.

In a virtualization environment, virtual machines can be associated with one or more peripheral devices, such as a printer, a microphone, a headset, a camera, a webcam, an optical drive, an external or internal hard drive, a keyboard, a pointing device, a universal serial bus (USB) device, etc. A user may make such associations, for example, by assigning a grid or a list of peripheral devices to a plurality of virtual machines through a device manager interface, which provides the list of peripheral devices, the type of the peripheral devices (e.g., ports, USB, USB video, etc.), dropdown menus for the assignment, and checkboxes for deleting or keeping the current assignment. Therefore, for managing a peripheral device assignment, a user is typically required to bring up the device manager in a control panel and go through several steps. The process for managing the peripheral devices is thus burdensome, not user friendly, and prone to error.

BRIEF DESCRIPTION OF THE DRAWINGS

Reference will now be made to the accompanying drawings showing example embodiments of this disclosure.

FIG. 6 is a flowchart of an exemplary method for managing assignment of peripheral devices in a virtualization environment, consistent with embodiments of the present disclosure.

FIG. 7 is a flowchart of an exemplary method for designating established associations as persisting associations, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies for managing assignment of peripheral devices in a virtualization environment. The techniques described herein can provide a user-friendly interface and method for associating peripheral devices to virtual machines, determining the current associations of the peripheral devices and virtual machines, removing existing associations, re-establishing associations, and designating one or more of the associations as persisting associations.

Figure 1:
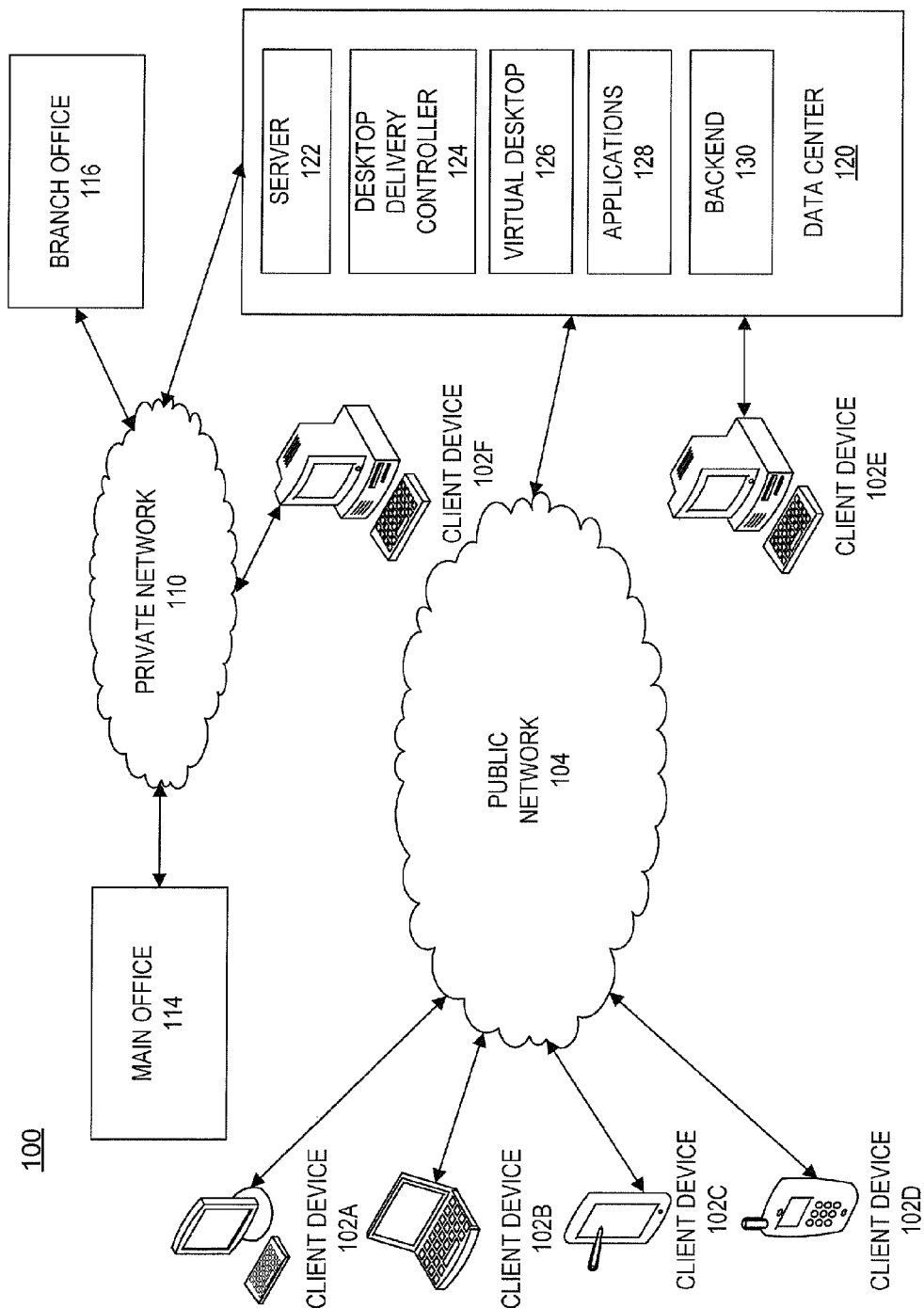
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiment, a main office 114 and a branch office 116 can also include one or more client devices that are similar to client devices 102A-F. Main office 114 can be located, for example, in a principle place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g., client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can be hosted shared desktops allowing multiple users to access a single shared remote-desktop-services desktop. Virtual desktop 126 can also be virtual desktop infrastructure (VDI) desktops allowing each user to have their own virtual machines, personalized virtual desktops, streaming disk images, individual applications (e.g., one or more applications 128), or a combination thereof. In some embodiments, client devices 102A-F can receive representations of virtual desktops 126 (images or copies of virtual desktops 126) through at least one of public network 104 and private network 110. Client devices 102A-F can also provide one or more virtual desktops such as client-side hosted virtual desktops allowing local access to the virtual desktops.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 116.

Figure 2A:
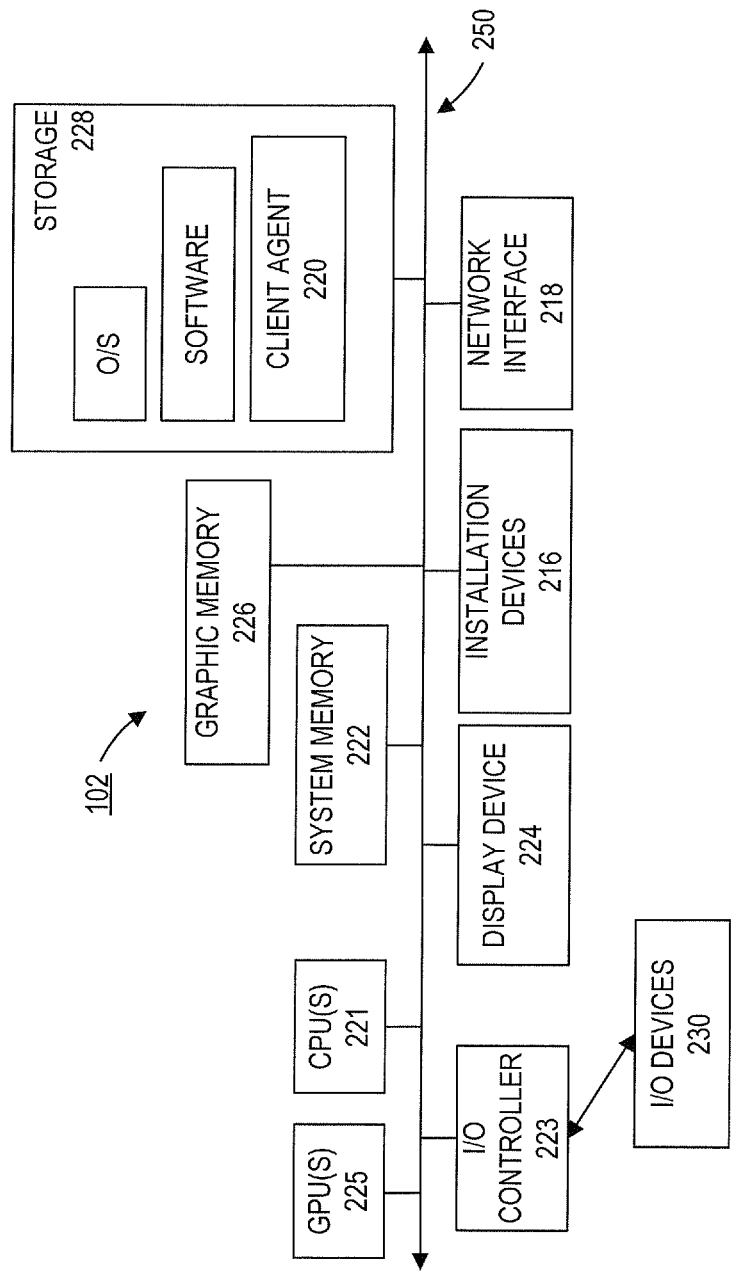
FIGS. 2A-2B are block diagrams of an exemplary electronic device, consistent with embodiments of the present disclosure.
Figure 2B:
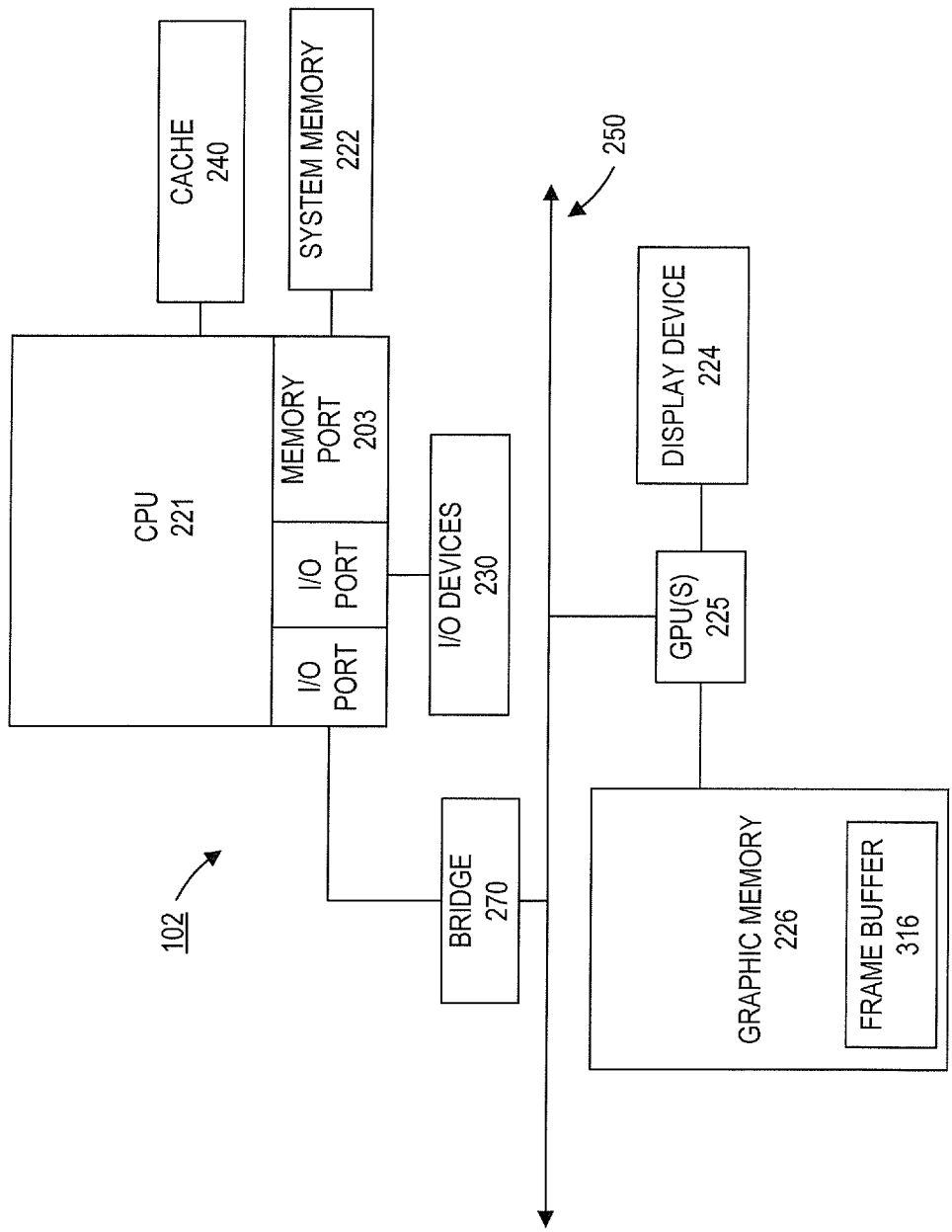

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 225 or graphic memory 226. For example, GPUs 225 can receive instructions transmitted by the CPUs 221 and process the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Client device 102 can also include display device 224 and an input/output (I/O) device 230 (e.g., a keyboard, a mouse, or a pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Moreover, display device 224 can be any output device for visual presentation of information. Display device 224 can be two-dimensional or three dimensional, including, for example, a flat-panel display, a touch-screen display, a flexible display, a laser display, a holographic display, etc. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 can store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
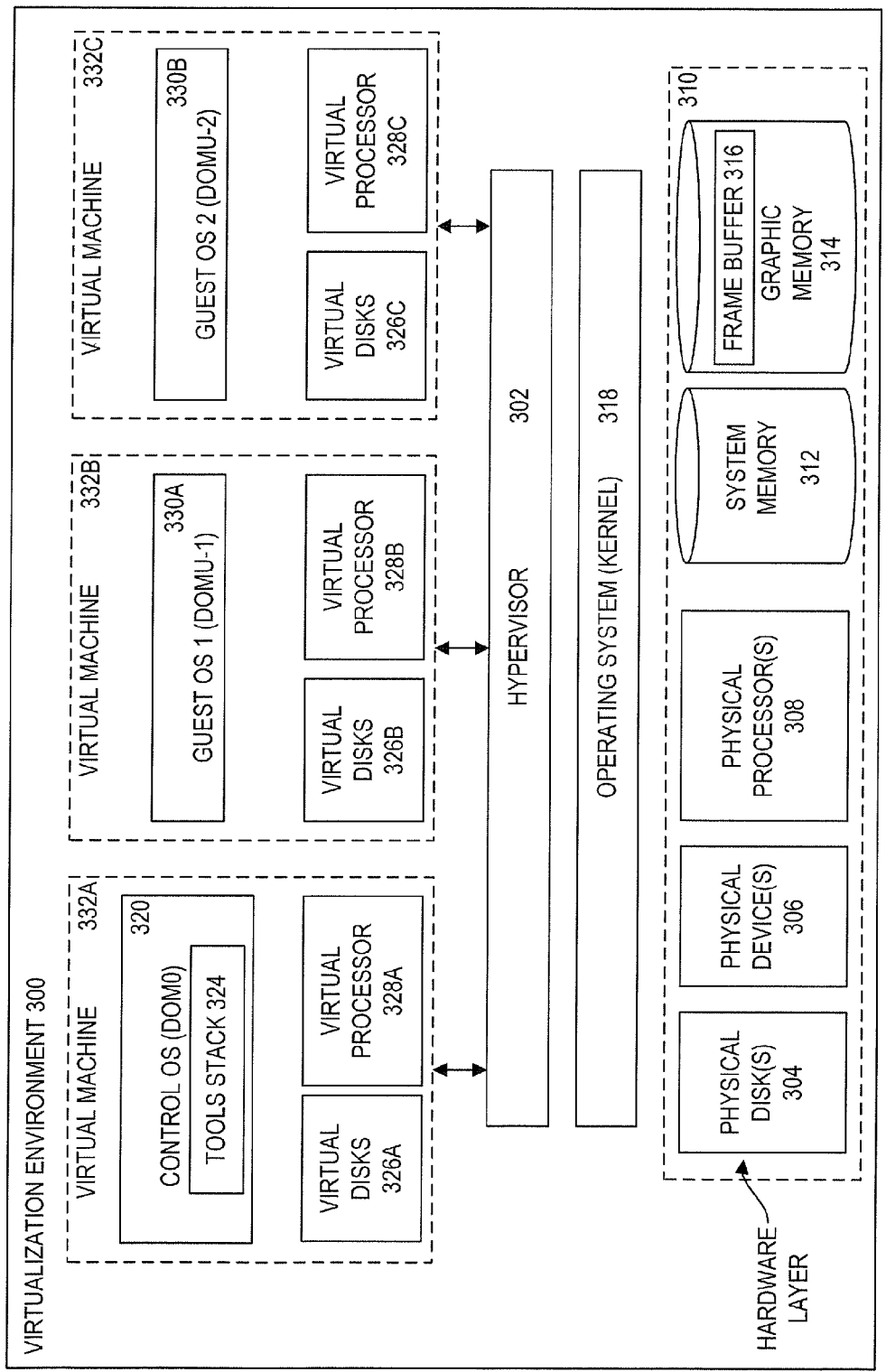
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include an electronic device or computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304, one or more physical devices 306, one or more physical processors 308, a system memory 312, and a graphic memory 314. In some embodiments, frame buffer 316 can be stored within a memory element in graphic memory 314 and can be accessed by one or more of physical processors 308.

Physical disk 304 can be either an internal or an external hard disk. Virtualization environment 300 can communicate with an external hard disk that is included in the hardware layer 310 as a physical disk 304. Physical devices 306 can be any combination of devices included in virtualization environment 300 and external devices that communicate with virtualization environment 300. Physical device 306 can be any device such as a network interface card, a video card, a monitor, a display device, any device connected to virtualization environment 300, any device communicating with virtualization environment 300, or any other device that is desired. Physical devices 306 can also be a peripheral device, such as a keyboard, a pointing device, an input device (e.g., a stylus), speakers, a printer, a scanner, an optical drive, an internal or external storage device, a universal serial bus (USB) connection/device, a microphone, a headset, a webcam, a camera, etc. A pointing device can be, for example, a mouse, a stylus, a trackball, a joystick, a pointing stick, a human finger, or any other input interface that can allow a user to input data to a computing device. In some embodiments, physical processors 308 can be any processor and can include, for example, CPUs and GPUs.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics corresponding to graphical data stored in graphic memory 314 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing device. Hypervisor 302 can be stored in a memory element in system memory 312.

Hypervisor 302 can provide virtual resources to one or more virtual machines, e.g., virtual machines 332A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine (e.g., virtual machine 332B-C). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machines 332A). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machine 332A-C executing in virtualization environment 300.

In some embodiments, hypervisor 302 can create virtual machines 332A-C, in which control operating system 320 or guest operating systems 330A-B execute, respectively. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g. virtual machine 332A). This dom0 virtual machine can imitate the host operating system by allowing a user to interact with the computing device in substantially the same manner that the user would interact with the computing device via host operating system 318.

Virtualization environment 300 can host or execute one or more virtual machines 332A-C. As described above, a virtual machine executing a control operating system can be referred to as a dom0 virtual machine; and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more virtual disks 326A-C (collectively as 326). Virtual disks 326 can correspond to, for example, one or more physical disks or a portion of a physical disk (e.g., physical disks 304). As an example, virtual disk 326A can be allocated a first portion of physical disks 304; virtual disk 326B can be allocated a second portion of physical disks 304; and virtual disk 326C can be allocated a third portion of physical disks 304. In some embodiments, one or more of virtual disks 326A-C can include disk partitions and a file system, similar to those of a physical disk. For example, virtual disk 326A can include a system disk, which includes disk partitions and system files associated with virtual machine 332A. In some embodiments, the system disk can be shared among virtual machines. For example, virtual machines 332B and 332C can have the same or similar system disk.

The file systems of virtual disks 326A-C can also include files and folders. For example, virtual disk 326A can also include a user disk, which can store user data such as user files and folders. The user data stored on a user disk is also referred to as persistent user data. In some embodiments, the system disk and/or the user disk of a virtual machine of a client device (e.g., client device 102) can be synchronized with the corresponding disks stored in a server (e.g., server 122). The synchronization of system disk and/or the user disk between the server and the client device can include, for example, updating the system disk to a newer version published by the server and providing backup of the user disk. In some embodiments, a virtual disk can also include a local disk. The local disk can store local data associated with a virtual machine (e.g., virtual machine 332B). The local disk can also include persistent user data. In some embodiments, the persistent user data stored on a local disk cannot be synchronized with a server.

In some embodiments, virtualization environment 300 can also include virtual apertures (not shown) in a virtual memory space, which can be a virtual view of the virtual memory available to virtual machines 332. The virtual apertures can correspond to for example, caches, buffers, physical memories such as system memory 312, and graphic memory 314, internal or external physical disks such as hard disk 304. As an example, under the circumstances that applications running on virtual machine 332A do not require memory more than that is available in system memory 312; the virtual apertures of virtual machine 332A can correspond to a portion of system memory 312. As another example, under the circumstances that applications executed by virtual machine 332B requires memory more than that is available in system memory 312, the virtual apertures of virtual machine 332B can correspond to one or more portions of system memory 312, graphic memory 314, or even one or more portions of physical disks 304. The virtual apertures can be generated, provided, and managed by hypervisor 302.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308.

In FIG. 3, control operating system 320 can execute at least one application for managing and configuring the guest operating systems (domUs 330, e.g. domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute an administrative application or program that can further display a user interface on a display device (e.g., display device 224 in FIG. 2B). Administrators can use the user interface to access the functionality of each virtual machine 332 and/or to manage each virtual machine 332. In some embodiments, the user interface generated by the administrative program can be used to terminate the execution of virtual machines 332, allocate resources (e.g., peripheral devices) to virtual machines 332, assign permissions to virtual machines 332, or manage security credentials associated with virtual machines 332.

Moreover, in some embodiments, control operating system 320 can start new virtual machines 332 or terminate execution of virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, guest operating systems 330 can provide users of virtualization environment 300 with access to resources within a computing environment. Such resources can include programs, applications, files, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4B:
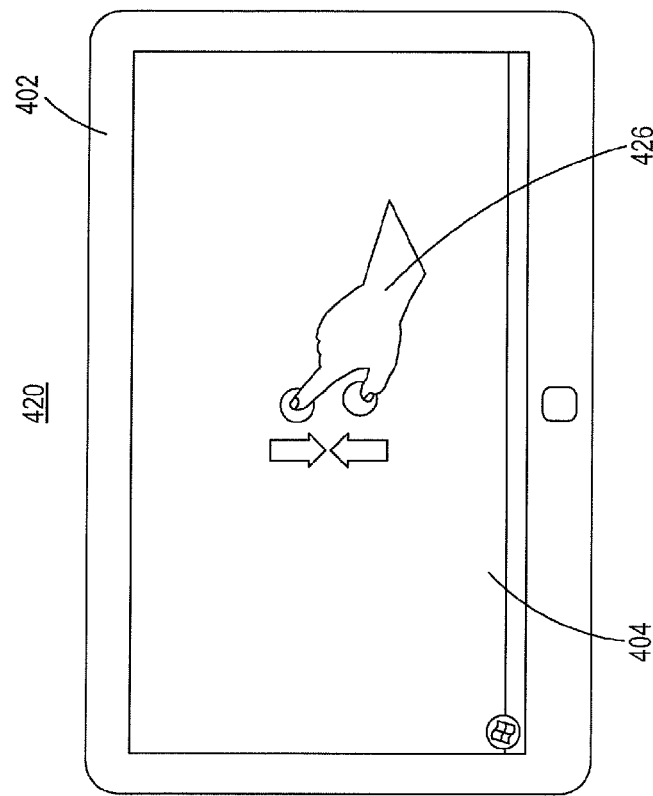
FIG. 4B is a diagram illustrating an exemplary user interface for detecting a user input to display virtual desktops, consistent with embodiments of the present disclosure.
Figure 4A:
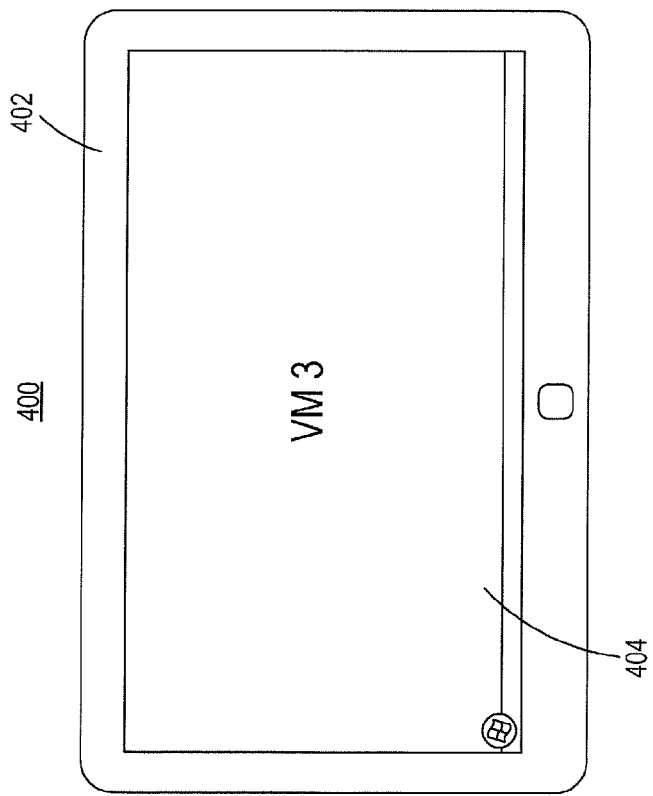
FIG. 4A is a diagram illustrating a user interface showing an exemplary representation of a virtual desktop, consistent with embodiments of the present disclosure.

FIG. 4A is diagram 400 illustrating a user interface 404 showing an exemplary representation of a virtual desktop. Electronic device 402 can be, for example, client device 102.

Electronic device 402 can be a touch-screen device or any type of computing device, such as a tablet device. In some embodiments, virtual machines can be executed by or reside on electronic device 402. As a result, user interface 404 can display one or more virtual desktops associated with the virtual machines. In some embodiments, virtual machines can be executed by or reside on a remote computing device, such as server 122 in data center 120, which can remotely communicate with electronic device 402. As a result, electronic device 402 can display images (e.g., copies) representing one or more virtual desktops that are associated with the virtual machines. Virtual desktops themselves or images that represent virtual desktops are referred to as representations of virtual desktops or virtual desktops for simplicity. FIG. 4A illustrates an exemplary representation of a virtual desktop (e.g., virtual desktop of virtual machine No. 3 or VM3 virtual desktop) displayed on user interface 404.

User interface 404 can display one or more virtual desktops. As shown in FIG. 4A, user interface 404 can display a virtual desktop associated with an active virtual machine (e.g., the VM 3 virtual desktop). An active virtual machine is a virtual machine that is currently running or executing and is not hibernated or shut down. The virtual desktop can be displayed to occupy the entire portion of user interface 404 (e.g., the entire screen area of electronic device 402) or any portion of user interface 404.

FIG. 4B is a diagram 420 illustrating user interface 404 for detecting a user input 426 to display virtual desktops. To allow a user to manage assignments of peripheral devices to virtual desktops, electronic device 402 can enable user interface 404, which displays a current virtual desktop (e.g., VM3 virtual desktop), to detect user input 426. For example, user input 426 can be a pre-defined gesture for a touch-screen user interface, such as a multi-touch gesture (e.g., holding a home button of electronic device 402 and pinching user interface 404). After detecting user input 426, user interface 404 can display a plurality of virtual desktops and a plurality of representations of peripheral devices. For example, based on the detection of user input 426, electronic device 402 can "zoom out" the active virtual desktop (e.g., the VM 3 virtual desktop). As another example, user input 426 can be a pre-configured key combination (e.g., Ctrl+0) that can be received via a keyboard (e.g., an internal soft keyboard or external keyboard) attached to electronic device 402. The pre-defined gesture or the pre-configured key combination can be configured or selected so to avoid conflicts with gestures or key combinations that are pre-defined for other purposes. In some embodiments, user input 426 can be applied by one or more pointing devices, such as human fingers or styluses.

Figure 4C:
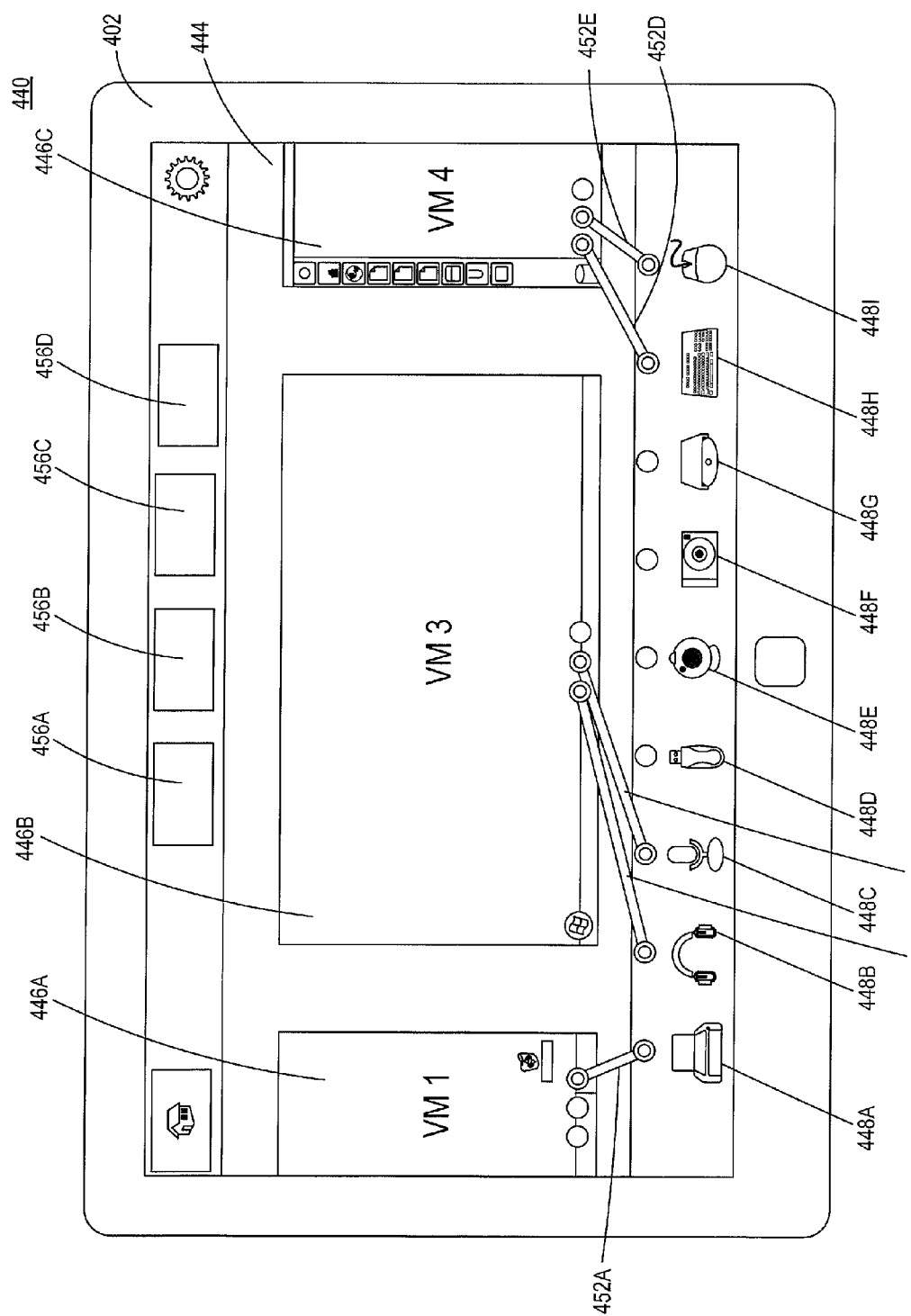
FIG. 4C is a diagram illustrating an exemplary user interface for associating virtual machines with peripheral devices, consistent with embodiments of the present disclosure.

FIG. 4C is a diagram 440 illustrating user interface 444 for associating virtual machines with peripheral devices. As discussed above, after detecting user input 426, electronic device 402 can "zoom out" the active virtual desktop (e.g., the VM 3 virtual desktop) such that the active virtual desktop is not being displayed using the entire portion of user interface 444. As a result, user interface 444 can display a plurality of virtual desktops, such as a virtual desktop 446A associated with VM 1, a virtual desktop 446B associated with VM 3, and a virtual desktop 446C associated with VM 4. Virtual desktops 446A-C can be, for example, active virtual desktops. Moreover, virtual desktops 446A-C can be associated with virtual machines that have the same or different operating systems. For example, virtual desktop 446A can be associated with VM 1, which is running a Windows XP™ operating system; virtual desktop 446B can be associated with VM 3, which is running a Windows 7™ operating system; and virtual desktop 446C can be associated with VM 4, which is running a Unix or Linux operating system. It is appreciated that user interface 444 can display any number of virtual desktops associated with virtual machines having any type of operating systems.

As shown in FIG. 4C, user interface 444 can further display representations of a plurality of peripheral devices, such as a printer icon 448A, a headset icon 448B, a microphone icon 448C, a USB device icon 448D, a webcam icon 448E, a camera icon 448F, an optical drive icon 448G, a keyboard icon 448H, and a mouse icon 448I (collectively referred to as icons 448A-I). In some embodiments, user interface 444 can display the representations of peripheral devices based on detections that the peripheral devices are communicatively coupled to a hypervisor or a control virtual machine. For example, a hypervisor (e.g., hypervisor 302 of FIG. 3) or a control virtual machine (e.g., a dom0 virtual machine 332A of FIG. 3) can detect the presence of one or more peripheral devices and have access to the peripheral devices. After detecting the presence of the peripheral devices, the hypervisor or the control virtual machine can provide information identifying the available peripheral devices to electronic device 402. Based on the provided information, user interface 444 can thus display representations (e.g., icons) of the peripheral devices. It is appreciated that user interface 444 can display representations (e.g., icons, names, animations, photos, etc.) of any number and any type of peripheral devices.

User interface 444 can enable the user to manage the associations of peripheral devices (e.g., peripheral devices represented by icons 448A-I) with virtual machines that are associated with virtual desktops (e.g., virtual desktops 446A-C). In some embodiments, electronic device 402 can enable user interface 444 to detect a user input with respect to a virtual desktop and a representation of peripheral device. For example, user interface 444 can detect a drag-and-drop operation, during which the user drags a representation of a peripheral device (e.g., printer icon 448A) and drops to the area indicated by virtual desktop 446A. The user input can be repeated as many times as desired with respect to the representations of the peripheral devices (e.g., icons 448A-I) and the virtual desktops displayed on user interface 444. For example, for establishing an association of the headset represented by headset icon 448B with virtual desktop 446B and an association of the keyboard represented by keyboard icon 448G with virtual desktop 446C a user can drag headset icon 448B and keyboard icon 448G, and drop them to areas indicated by virtual desktop 446B and 446C, respectively.

As shown in FIG. 4C, in some embodiments, after user interface 444 detects the user input with respect to one or more virtual desktops and representations of one or more peripheral devices, electronic device 402 can facilitate to establish one or more associations between the peripheral devices and the virtual machines associated with the virtual desktops. As an example, after user interface detects a drag-and-drop operation with respect to headset icon 448B and virtual desktop 446B, electronic device 402 can facilitate establishing an association between the headset represented by headset icon 448B and the virtual machine associated with virtual desktop 446B. In some embodiments, the association can be established by a control virtual machine that resides on electronic device 402 or a remote computing device (e.g., server 122). As another example, if after an association is established between the headset represented by headset icon 448B and the virtual machine represented by virtual desktop 446B, user interface 444 detects another drag-and-drop operation of the same headset icon 448B with respect to virtual desktop 446C, electronic device 402 can facilitate removing the existing association and establishing a new association between the headset represented by headset icon 448B and the virtual machine associated with virtual desktop 446C. It is appreciated that based on the detecting of one or more user inputs, electronic device 402 can facilitate establishing, removing, and/or re-establishing an association between peripheral devices (e.g., peripheral devices represented by icons 448A-I) and virtual machines (e.g., virtual machines represented by virtual desktops 446A-C) in any desired manner. The established associations can be stored in a storage device (e.g., virtual disks, physical disks, virtual apertures, physical apertures, etc.).

In some embodiments, electronic device 402 can enable user interface 444 to display associations between the peripheral devices and the virtual machines associated with the virtual desktops. As shown in FIG. 4C, user interface 444 can display a line between the representations of peripheral devices and the corresponding virtual desktops. For example, user interface 444 can display a line 452A connecting printer icon 448A and virtual desktop 446A, indicating an association between the printer represented by icon 448A and virtual desktop 446A. Similarly, user interface 444 can display a line 452B connecting headset icon 448B and virtual desktop 446B, and a line 452C connecting microphone icon 448C and virtual desktop 446B, indicating the association of these two peripheral devices with virtual desktop 446B. It is appreciated that associations between peripheral devices and virtual desktops can be displayed in any manners including using lines.

In some embodiments, some peripheral devices, such as a keyboard and/or a mouse, can be automatically assigned to all virtual machines. Therefore, association of such peripheral devices with virtual machines may not be required. In some embodiments, association of such peripheral devices with virtual machines may still be required. As shown in FIG. 4C, for example, a user may want to assign a keyboard represented by keyboard icon 448H and a mouse represented by mouse icon 448I to the virtual machine represented by virtual desktop 446C. The user can thus perform operations, such as dragging keyboard icon 448H and mouse icon 448I and dropping to the area indicated by virtual desktop 446C. After detecting such drag-and-drop operations, electronic device 402 can facilitate establishing the associations between the keyboard represented by keyboard icon 448H and the mouse represented by mouse icon 448I with the virtual machine represented by virtual desktop 446C. For example, electronic device 402 can provide the detected user input (e.g., drag-and-drop operations) to a hypervisor or control virtual machine of a remote computing device (e.g., server 122) to enable the remote computing device to establish the associations. Electronic device 402 can also enable user interface 444 to display the associations, for example, by using lines 452D and 452E connecting keyboard icon 448H and mouse icon 448I with virtual desktop 446C, respectively.

In some embodiments, a peripheral device can be associated with a single virtual machine and cannot be associated with other virtual machines. For example, as shown in FIG. 4C, if headset icon 448B is connected with virtual desktop 446B, it indicates that the headset represented by headset icon 448B is associated with the virtual machine associated with virtual desktop 446B. As a result, the headset cannot be associated with other virtual machines (e.g., virtual machines 446A or 446C) without being disassociated from the currently associated virtual machine. In such embodiments, the headset represented by represented by headset icon 448B, and similarly other peripheral devices, can only be associated with one virtual machine at a time (e.g., the virtual machine represented by virtual desktop 446B).

In some embodiments, a peripheral device can be associated with a plurality of virtual machines. For example, the printer represented by printer icon 448A can be hosted by one virtual machine as a service virtual machine. Via such service virtual machine, other virtual machines can communicate directly, or indirectly with the printer represented by printer icon 448A. As a result, the printer represented by printer icon 448A can be associated with a plurality of virtual machines associated with virtual desktops 446A-C (the multiple associations are not shown in FIG. 4C). In such embodiments, the printer represented by printer icon 448A, and similarly other peripheral devices, can be associated and shared with multiple virtual machines. In some embodiments, a peripheral device can be associated with one or more applications (e.g., applications 128) of a virtual machine. For example, the microphone represented by microphone icon 448C can be associated with a recording application that is executing on the virtual machine associated with virtual desktops 446B. A guest operating system (e.g., guest operating system 330A) can facilitate such association.

In FIG. 4C, in some embodiments, user interface 444 can also display thumbnail images of a plurality of virtual desktops. For example, user interface 444 can display thumbnail images 456A-D, of which images 456A-C correspond to virtual desktops 446A-C, respectively. Displaying the thumbnail images of virtual desktops can provide the user with an overview of the virtual desktops. For example, as shown in FIG. 4C, user interface 444 can display the entire virtual desktop 446B in the center portion, and part of virtual desktops 446A and 446C. User interface 444 may not display other virtual desktops due to the limitation of the screen size of electronic device 402. But user interface 444 can display thumbnails images to show additional virtual desktops (e.g., virtual desktop 456D). Moreover, user interface 444 can also detect a user input selecting one of the thumbnail images so that the corresponding virtual desktop is displayed in the center portion of user interface 444. For example, after user interface 444 detects a user input selecting thumbnail image 456A, it can display the corresponding virtual desktop 446A in the center portion of user interface 444. It is appreciated that user interface 444 can display the thumbnail images, the virtual desktops, and the representations of peripheral devices in any manner that is desired.

In some embodiments, user interface 444 can detect an input to display a virtual desktop such that it occupies the entire portion of user interface 444 (e.g., the entire screen area of electronic device 402). For example, after the associations between the peripheral devices and the virtual machines are established, user interface 444 can detect a pre-defined gesture (e.g., a single touch or click in the area of virtual desktop 446B) or a pre-configured key combination and display virtual desktop 446B in a full-screen mode.

Figure 4E:
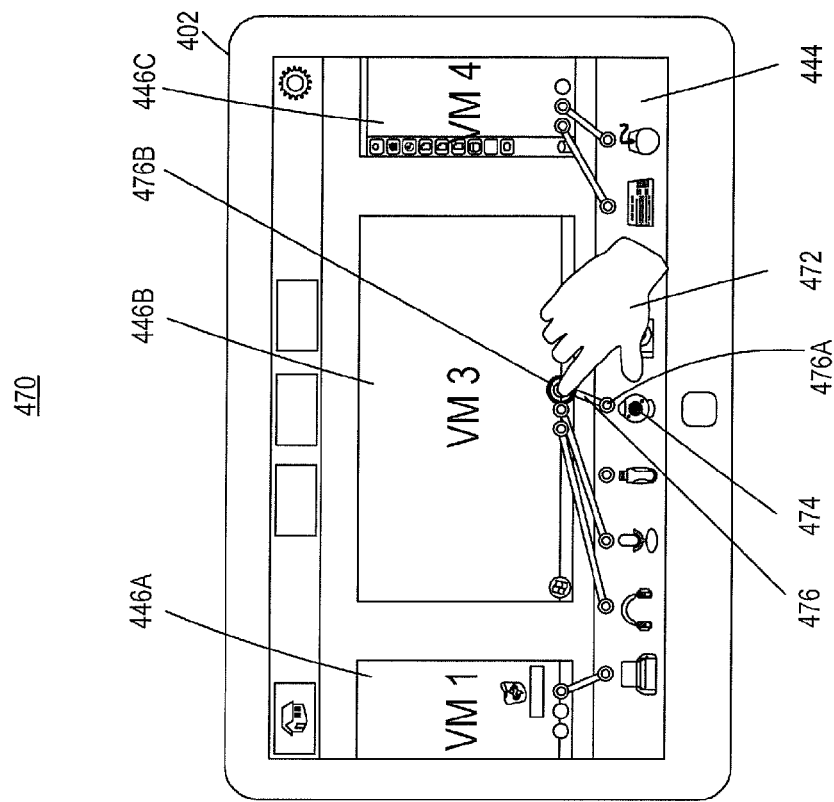
FIG. 4E is a diagram illustrating an exemplary user interface for designating persisting associations, consistent with embodiments of the present disclosure.
Figure 4D:
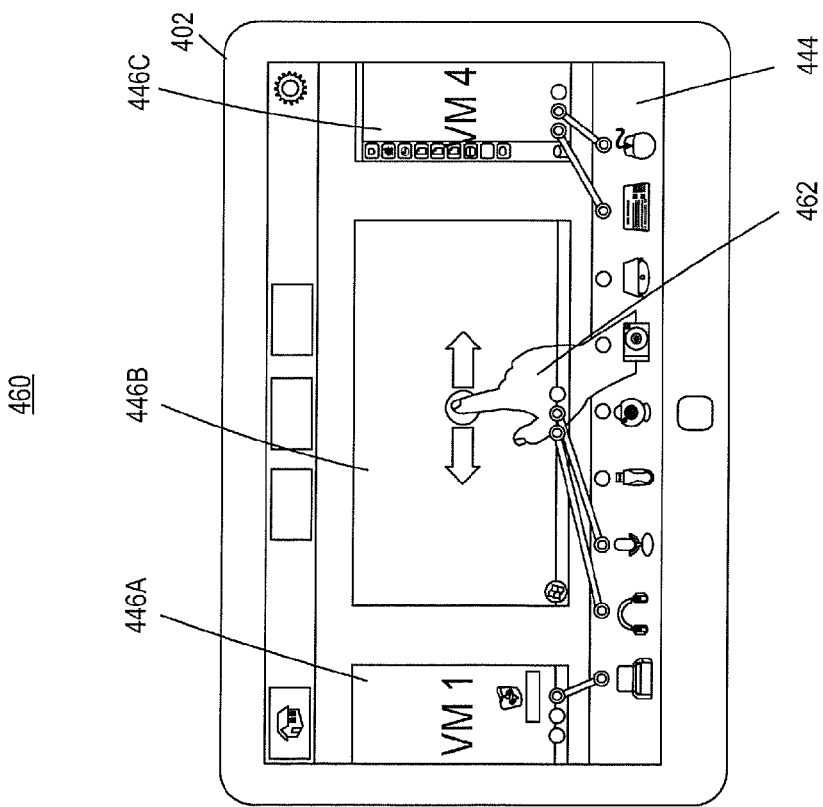
FIG. 4D is a diagram illustrating an exemplary user interface for re-arranging relative positions of virtual desktops, consistent with embodiments of the present disclosure.

FIG. 4D is a diagram 460 illustrating exemplary user interface 444 for re-arranging relative positions of virtual desktops. As shown in FIG. 4D, electronic device 402 can enable user interface 444 to detect a user input 462 to re-arrange the relative positions of virtual desktops displayed on user interface 444. User input 462 can be, for example, an operation to move (e.g., hold and drag) a virtual desktop to the left or right, or to any other portion of user interface 444. After user interface 444 detects user input 462, electronic device 402 can enable the movement of the virtual desktops according to user input 462 and enable user interface 404 to display the re-arranged virtual desktops. For example, after detecting user input 462 for moving virtual desktop 446B to the right, user interface 444 can display virtual desktop 446A in the center portion of user interface 444 and move virtual desktop 446B to the right portion.

FIG. 4E is a diagram 470 exemplary user interface 444 for designating persistent associations. As shown in FIG. 4E, electronic device 402 can enable user interface 444 to detect a user input 472 for designating one or more existing associations to be persisting associations. Persisting associations are associations between peripheral devices and virtual machines that are capable of being re-established or maintained over a triggering event. A persisting association can be, for example, an association that is permanent or persisting across reboot or reload of virtual machines (e.g., VM1 represented by virtual desktop 446A and VM3 represented by virtual desktop 446B), or across reboot, shutdown, or hibernate of physical devices (e.g., electronic device 402 or server 122). In some embodiments, the persisting associations can be stored in a storage device (e.g., virtual disks, physical disks, virtual apertures, physical apertures, etc.), and can be automatically re-established after reboot or reload of virtual machines or physical electronic devices. A triggering event can be an event that typically would cause an established association to be lost if the association is not designated to be persisting. For example, triggering events can be system reboots, reloads, lapse of time, loss of power, forced shutdown, or any other events that can cause a non-persisting association to be lost.

As discussed above, after detecting a user input such as a drag-and-drop operation, electronic device 402 can facilitate establishing an association between a peripheral device (e.g., the webcam represented by webcam icon 474) and a virtual machine (e.g., the virtual machine represented by virtual desktop 446B). User interface 444 can display a line 476 connecting webcam icon 474 and virtual desktop 446B, indicating that the association between the webcam represented by webcam icon 474 and virtual machine associated with virtual desktop 446B is established. If the user desires to designate this association as a persisting association between the webcam and the virtual machine, user interface 444 can allow the user to provide an input indicating that such designation is desired. As an example, user interface 444 can detect a touch (e.g., a single touch, a double touch, or a touch-and-hold) input on or near one end of line 476 (e.g., line end 476B). After detecting such user input, electronic device 402 can facilitate designating a persisting association between the webcam represented by webcam icon 474 and the virtual machine associated with virtual desktop 446B. For example, electronic device 402 can request a control virtual machine running on a remote computing device (e.g., server 122) to make such designation. As a result of the designation, the association between the webcam and the virtual machine can be reloaded, re-established, or maintained over to a triggering event, such as reboots of the virtual machine or a physical electronic device. It is appreciated that electronic device 402 can enable user interface 444 to detect user input indicating the designation of persisting associations in any desired manner.

Figure 4F:
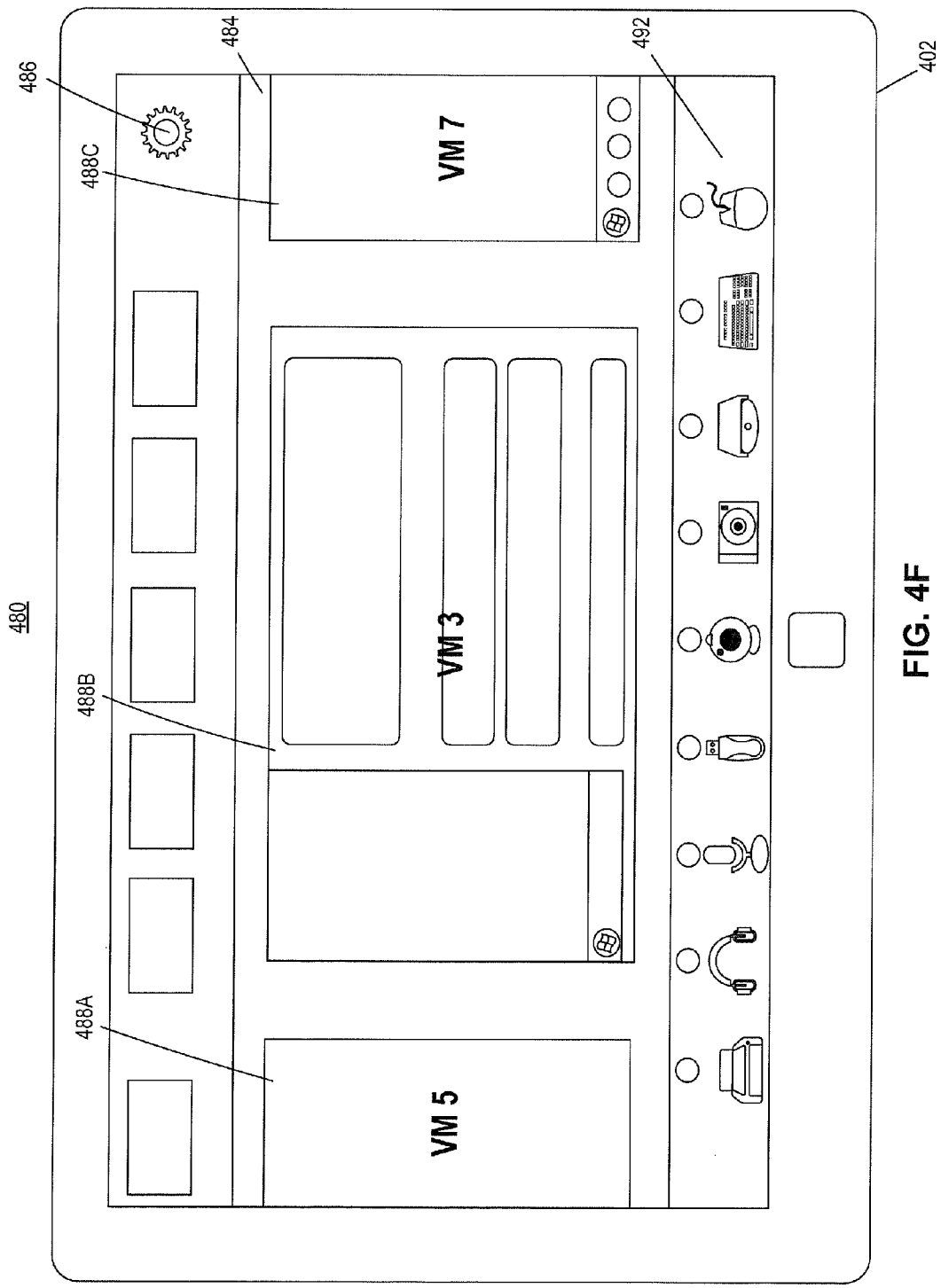
FIG. 4F is a diagram illustrating an exemplary user interface for associating inactive virtual machines with peripheral devices, consistent with embodiments of the present disclosure.

FIG. 4F is a diagram 480 illustrating a user interface 484 for associating inactive virtual machines with peripheral devices. As discussed above, electronic device 402 can facilitate establishing an association between peripheral devices and virtual machines. In some embodiments, as shown in FIG. 4C, user interface 444 displays virtual desktops of a plurality of active virtual machines. In some embodiments, user interface 484 can also display all virtual desktops, including virtual desktops associated with active and inactive virtual machines. An inactive virtual machines can be a virtual machine in, for example, hibernate mode. A virtual machine in hibernate mode may release physical resources that the virtual machine is not using. A hibernating virtual machine can be restored to be an active virtual machine faster than if it is turned off or shut down.

As shown in FIG. 4F, for example, user interface 484 can display an interface switch (e.g., icon 486) and detect a user input (e.g., a touch input) with respect to the interface switch. After detecting such user input, electronic device 402 can enable user interface 484 to display all virtual desktops that are associated with active and inactive virtual machines. For example, in FIG. 4F, virtual desktops 488A and 488C can be associated with inactive virtual machines (VM 5 and VM7), and virtual desktop 488B can be associated with active virtual machines (VM 3). In some embodiments, virtual desktops associated with inactive virtual machines (e.g., virtual desktop 488A and 488C) can be shown in grey, or background, mode such that they can be distinguished from virtual desktops (e.g., colored virtual desktops) associated with active virtual machines.

In some embodiments, after user interface 484 displays virtual desktops associated with active and inactive virtual machines, it can enable the user to manage the association of peripheral devices (e.g., peripheral devices represented by icons 492) with the inactive and active virtual machines (e.g., virtual machines associated with virtual desktops 488A-C) in the same or similar manner as described above. User interface 484 can also enable the user to designate associations between peripheral devices and inactive virtual machines to be persisting associations in the same or similar manner as described above.

Figure 5:
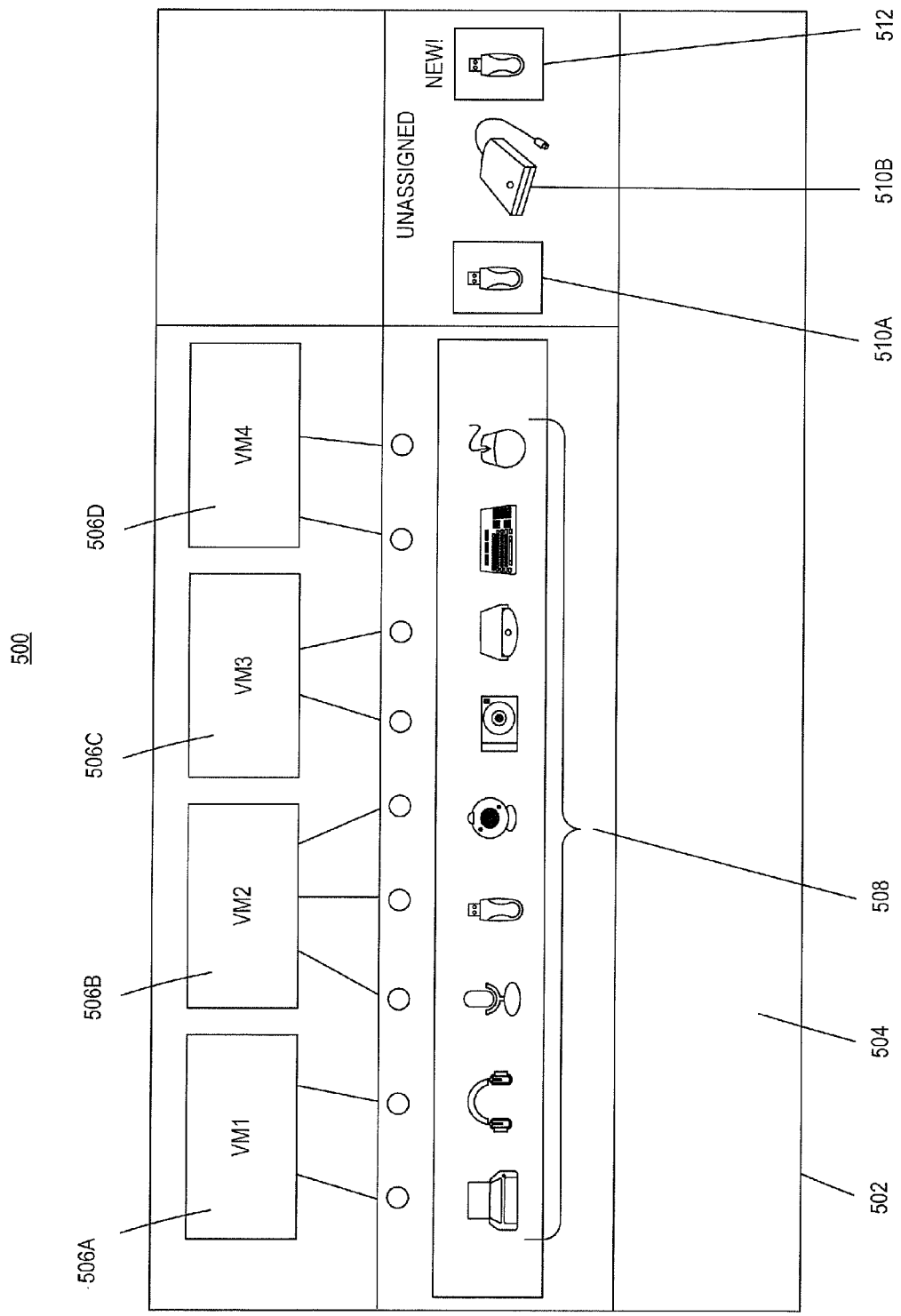
FIG. 5 is a diagram illustrating an exemplary user interface displaying associated, unassociated, and new peripheral devices, consistent with embodiments of the present disclosure.

FIG. 5 is a diagram 500 illustrating an exemplary user interface 504 showing associated, unassociated, and new peripheral devices. User interface 504 can display a plurality of virtual desktops, such as a virtual desktop 506A-D, that are associated with active and/or inactive virtual machines. User interface 504 can also display representations of a plurality of peripheral devices (e.g., icons 508). In some embodiments, if associations of the peripheral devices represented by icons 508 and virtual machines associated with virtual desktops 506A-D are established, user interface 504 can display representations of such associations by, for example, lines between icons 508 and virtual desktops 506A-D.

In some embodiments, user interface 504 can display icons of representations of one or more peripheral devices (e.g., icons 510A-B) that are not associated with virtual machines. For example, as shown in FIG. 5, user interface 504 can display icons 510A and 510B in a separate area designed as "unassigned." User interface 504 can also display the representations of one or more new peripheral devices (e.g., a USB device represented by icon 512), based on detection of such new peripheral devices. The new peripheral device can be communicatively coupled to a hypervisor or a control virtual machine. For example, a hypervisor (e.g., hypervisor 302) or a control virtual machine (e.g., a dom0 virtual machine 332A) can detect the presence of one or more peripheral devices that are newly attached to a physical electronic device (e.g., electronic device 502 or server 122). After detecting the presence of such new peripheral devices, the hypervisor or the control virtual machine can provide information identifying the new peripheral devices to electronic device 502. Based on the provided information, user interface 504 can thus display the representations (e.g., icons, names, animations, photos, etc.) of the new peripheral devices. In some embodiments, user interface 504 can display a drop-down animation with respect to, for example, icon 512 to indicate that a new peripheral device is available.

FIG. 6 is a flowchart of an exemplary method 600 for managing assignment of peripheral devices in a virtualization environment. It will be readily appreciated that the illustrated procedure can be altered to delete steps or further include additional steps.

After initial step 610, an electronic device (e.g., electronic device 402) can provide (step 620) a user interface (e.g., user interface 404) to display one or more representations of virtual desktops, which are associated with corresponding virtual machines. The user interface can display a plurality of virtual desktops that are associated with active and/or inactive virtual machines. In some embodiments, virtual machines can be executed by or reside on the electronic device. As a result, the user interface can display one or more virtual desktops associated with the virtual machines. In some embodiments, virtual machines can be executed by or reside on a remote computing device, such as server 122 in data center 120, which can remotely communicate with the electronic device. As a result, the electronic device can display images (e.g., copies) representing one or more virtual desktops that are associated with the virtual machines. The virtual desktop can be displayed to occupy the entire portion of the user interface or any portion of the user interface.

In some embodiments, to allow a user to manage assignments of peripheral devices to virtual desktops, the electronic device can enable the user interface, which displays a current virtual desktop, to detect a user input. For example, the user input can be a pre-defined gesture for a touch-screen user interface, such as a multi-touch gesture (e.g., holding a home button of the electronic device and pinching the user interface). After detecting the user input, the user interface can display a plurality of virtual desktops and a plurality of representations of peripheral devices. For example, based on the detection of the user input, the electronic device can "zoom out" the active virtual desktop. As another example, the user input can be a pre-configured key combination (e.g., CtrI+0) that can be received via a keyboard (e.g., an internal soft keyboard or external keyboard) attached to the electronic device. The pre-defined gesture or the pre-configured key combination can be configured or selected so to avoid conflicts with gestures or key combinations that are pre-defined for other purposes. In some embodiments, the user input can be applied by one or more pointing devices, such as human fingers or styluses.

As shown in FIG. 6, the electronic device can provide (step 630) to the user interface to display one or more representations of peripheral devices based on detection that the peripheral devices are communicatively coupled to a control virtual machine of the virtualization environment. For example, a hypervisor (e.g., hypervisor 302) or a control virtual machine (e.g., a dom0 virtual machine 332A) can detect the presence of one or more peripheral devices and have access to the peripheral devices. After detecting the presence of the peripheral devices, the hypervisor or the control virtual machine can provide information identifying the available peripheral devices to the electronic device. Based on the provided information, the user interface can thus display representations (e.g., icons) of the peripheral devices. It is appreciated that the user interface can display representations (e.g., icons, names, animations, photos, etc.) of any number and any type of peripheral devices.

The electronic device can detect (step 640) one or more user inputs received with respect to the one or more representations of the virtual desktops and the one or more representations of the peripheral devices. As discussed above, the user interface can enable the user to manage the associations of peripheral devices with virtual machines. In some embodiments, the electronic device can enable the user interface to detect a user input with respect to a virtual desktop and a representation of peripheral device. For example, the user interface can detect a drag-and-drop operation, during which the user drags a representation of a peripheral device and drops to the area indicated by the virtual desktop. The user input can be repeated as many times as desired with respect to the representations of the peripheral devices and the virtual desktops displayed on the user interface.

As shown in FIG. 6, the electronic device can facilitate (step 650) establishing one or more associations, based on the detected first inputs, between the one or more peripheral devices and the virtual machines, representations of the established associations being displayed on the user interface. The representations of the associations can be displayed on the user interface and stored in the data storage component. As an example, after the user interface detects a drag-and-drop operation with respect a headset icon (e.g., headset icon 448B) and a virtual desktop (e.g., virtual desktop 446B), the electronic device can facilitate establishing an association between the headset represented by the headset icon and the virtual machine associated with the virtual desktop. In some embodiments, the association can be established by a control virtual machine that resides on the electronic device or a remote computing device (e.g., server 122). As another example, if after an association is established between the headset represented by the headset icon and the virtual machine associated with the virtual desktop, the user interface detects another drag-and-drop operation of the same headset icon with respect to another virtual desktop (e.g., virtual desktop 446C), the electronic device can facilitate to remove the existing association and to establish a new association between the headset represented by the headset icon and the virtual machine associated with the another virtual desktop. It is appreciated that based on detecting of one or more user inputs, the electronic device can facilitate establishing, removing, and/or re-establishing the association between peripheral devices and virtual machines in any desired manner.

In some embodiments, the electronic device can enable the user interface to display associations between the peripheral devices and the virtual machines associated with the virtual desktops. For example, the user interface can display a line between the representations of peripheral devices and the corresponding virtual desktops. It is appreciated that associations between peripheral devices and virtual desktops can be displayed in any manners other than using lines.

In some embodiments, some peripheral devices, such as a keyboard and/or a mouse, can be automatically assigned to all virtual machines. Therefore, association of such peripheral devices with virtual machines may not be required. In some embodiments, association of such peripheral devices with virtual machines may still be required.

In some embodiments, a peripheral device can be associated with a single virtual machine and cannot be associated with other virtual machines. For example, if a headset icon (e.g., headset icon 448B) is connected with a virtual desktop (virtual desktop 446B), it indicates that the headset represented by the headset icon is associated with the virtual machine associated with the virtual desktop. As a result, the headset cannot be associated with other virtual machines without being disassociated from the currently associated virtual machine. In such embodiments, the headset represented by the headset icon, and similarly other peripheral devices, can only be associated with one virtual machine at a time. In some embodiments, a peripheral device can be associated with a plurality of virtual machines. For example, the printer represented by a printer icon (e.g., printer icon 448A) can be hosted by one virtual machine as a service virtual machine. Via such service virtual machine, other virtual machines can communicate directly or indirectly with the printer. As a result, the printer can be associated with a plurality of virtual machines. In such embodiments, the printer represented by the printer icon, and similarly other peripheral devices, can be associated and shared with multiple virtual machines. In some embodiments, a peripheral device can be associated with one or more applications (e.g., applications 128) of a virtual machine. For example, a microphone represented by a microphone icon (e.g., microphone icon 448C) can be associated with a recording application that is executing on the virtual machine. A guest operating system (e.g., guest operating system 330A) can facilitate such association.

In some embodiments, the user interface can also display thumbnail images of a plurality of virtual desktops. Displaying the thumbnail images of virtual desktops can allow the user to have an overview of the virtual desktops. Moreover, the user interface can also detect a user input selecting one of the thumbnail images so that the corresponding virtual desktop is displayed in the center portion of the user interface. It is appreciated that the user interface can display the thumbnail images, the virtual desktops, and the representations of peripheral devices in any manner that is desired.

In some embodiments, the user interface can detect an input to display a virtual desktop such that it occupies the entire portion of the user interface (e.g., the entire screen area of the electronic device). For example, after the associations between the peripheral devices and the virtual machines are established, the user interface can detect a pre-defined gesture (e.g., a single touch or click in the area of the virtual desktop) or a pre-configured key combination and display the virtual desktop in a full-screen mode.

The electronic device can also enable the user interface to detect a user input to re-arrange the relative positions of virtual desktops displayed on the user interface. The user input can be, for example, an operation to move (e.g., hold and drag) a virtual desktop to the left or right, or to any other portion of the user interface. After the user interface detects such user input, the electronic device can enable the movement of the virtual desktops according to the user input and enable the user interface to display the re-arranged virtual desktops.

After step 650, method 600 can proceed to an end 660. Method 600 can also be repeated any desired number of times for managing the assignment of peripheral devices to virtual machines in the virtualization environment.

FIG. 7 is a flowchart of an exemplary method 700 for designating persisting associations, consistent with embodiments of the present disclosure. It will be readily appreciated that the illustrated procedure can be altered to delete steps or further include additional steps. After initial step 710, an electronic device (e.g., electronic device 402) can detect (step 720) one or more user inputs, which can be received with respect to one or more existing associations between the one or more peripheral devices and the one or more virtual desktops.

As discussed above, after detecting a user input such as a drag-and-drop operation, the electronic device can facilitate establishing an association between a peripheral device (e.g., a webcam represented by a webcam icon) and a virtual machine (e.g., a virtual machine represented by a virtual desktop). The user interface can display a line connecting the webcam icon and the virtual desktop, indicating that the association between the webcam represented by the webcam icon and the virtual machine associated with the virtual desktop is established. If the user desires to designate this association as a persisting association between the webcam and the virtual machine, the user interface can allow the user to provide an input indicating that such designation is desired. As an example, the user interface can detect a touch (e.g., a single touch, a double touch, or a touch-and-hold) input on or near one end of the line connecting the webcam icon and the virtual desktop.

As shown in FIG. 7, the electronic device can facilitate (step 730) to designate the one or more existing associations to be persisting associations. For example, the electronic device can facilitate designating a persisting association between the webcam represented by the webcam icon and the virtual machine associated with the virtual desktop. The electronic device can request a control virtual machine running on a remote computing device to make such a designation. As a result of the designation, the association between the webcam and the virtual machine can be reloaded, re-established, or maintained over to a triggering event, such as reboots of the virtual machine or a physical electronic device. It is appreciated that the electronic device can enable the user interface to detect user input indicating the designation of persisting associations in any desired manner.

After step 730, method 700 can proceed to an end 740. Method 700 can also be repeated any desired number of times for designating any number of established associations as persisting associations.

In the foregoing specification, an electronic device can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs and/or special purpose computers.

Embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An electronic device for managing assignment of peripheral devices in a virtualization environment, the electronic device comprising:
   a user interface configured to display one or more representations of virtual desktops, the virtual desktops being associated with corresponding virtual machines;
   one or more processors configured to:
      provide to the user interface to display one or more representations of the peripheral devices based on detection that the peripheral devices are communicatively coupled to a control virtual machine of the virtualization environment, wherein the control virtual machine is configured to control one or more of the virtual machines associated with the one or more representations of the virtual desktops;
      detect one or more first inputs received with respect to the one or more representations of the virtual desktops and the one or more representations of the peripheral devices; and
      facilitate to establish one or more associations, based on the detected first inputs, between the peripheral devices and the virtual machines, representations of the established associations being displayed on the user interface; and
   a data storage component configured to store the one or more established associations.

2. The electronic device of claim 1, wherein the user interface is a touch-screen interface.

3. The electronic device of claim 2, wherein the one or more processors is further configured to:
   enable the user interface to detect a second input;
   determine whether the second input corresponds to a pre-configured touch-screen gesture or a pre-configured key combination; and
   provide, based on the determination, to the user interface to display the one or more representations of the virtual desktop.

4. The electronic device of claim 2, wherein the one or more first inputs comprises drag-and-drop operations.

5. The electronic device of claim 1, wherein the representations of the established associations are displayed on the user interface as one or more lines connected between the one or more representations of the peripheral devices and the corresponding one or more representations of the virtual desktops.

6. The electronic device of claim 1, wherein the peripheral devices associated with at least one of the virtual machines are different from the peripheral devices associated with another one of the virtual machines.

7. The electronic device of claim 1, wherein the one or more processors are further configured to:
   enable the user interface to detect one or more third inputs that are received with respect to representations of the one or more established associations; and
   facilitate to designate the one or more established associations as persisting associations, wherein the persisting associations are re-established or maintained over to a triggering event.

8. The electronic device of claim 1, wherein at least some of the virtual desktops are associated with inactive virtual machines.

9. The electronic device of claim 1, wherein the one or more processors are further configured to:
   facilitate to detect an additional peripheral device; and
   provide the user interface to display the representation of the detected additional peripheral device in a designated area of the user interface.

10. The electronic device of claim 1, wherein the peripheral devices comprise at least one of: a keyboard, a pointing device, an input device, a monitor, a display device, a speaker, an optical drive, a storage device, a universal serial bus connection, a printer, a scanner, a camera, a headphone, or a microphone.

11. The electronic device of claim 1, wherein the one or more processors is configured to facilitate to establish one or more associations between the peripheral devices and the virtual machines comprises the one or more processors being configured to:
   facilitate to establish a first association between a first peripheral device and a first virtual machine; and
   facilitate to establish a second association between the first peripheral device and a second virtual machine.

12. A method for managing assignment of peripheral devices in a virtualization environment, the method being performed by one or more processors, the method comprising:
   displaying, on an electronic device, one or more representations of virtual desktops, the virtual desktops being associated with corresponding virtual machines;
   displaying one or more representations of the peripheral devices based on detection that the peripheral devices are communicatively coupled to a control virtual machine of the virtualization environment, wherein the control virtual machine is configured to control one or more of the virtual machines associated with the one or more representations of the virtual desktops;
   detecting one or more first inputs received with respect to the one or more representations of the virtual desktops and the one or more representations of the peripheral devices; and
   facilitating to establish one or more associations, based on the detected first inputs, between the peripheral devices and the virtual machines, representations of the established associations being displayed on the electronic device.

13. The method of claim 12, further comprising:
   detecting a second input;
   determining whether the second input corresponds to a pre-configured touch-screen gesture or a pre-configured key combination; and
   providing, based on the determination, to the electronic device to display the one or more representations of the virtual desktop.

14. The method of claim 12, wherein the one or more first inputs comprises drag-and-drop operations.

15. The method of claim 12, wherein the representations of the associations are displayed on the electronic device as one or more lines connected between the one or more representations of the peripheral devices and the corresponding one or more representations of the virtual desktops.

16. The method of claim 12, wherein the peripheral devices associated with at least one of the virtual machines are different from the peripheral devices associated with another one of the virtual machines.

17. The method of claim 12, further comprising:
   detecting one or more third inputs that are received with respect to representations of the one or more established associations; and
   facilitating to designate the one or more established associations as persisting associations, wherein the persisting associations are re-established or maintained over to a triggering event.

18. The method of claim 12, further comprising:
   facilitating to detect an additional peripheral device; and displaying the representation of the detected additional peripheral device in a designated area.

19. The method of claim 12, wherein facilitating to establish the one or more associations between the peripheral devices and the virtual machines comprises:
   facilitating to establish a first association between a first peripheral device and a first virtual machine; and
   facilitating to establish a second association between the first peripheral device and a second virtual machine.

20. A non-transitory computer readable storage medium storing instructions that are executable by one or more processors of an electronic device to cause the electronic device to perform a method for managing assignment of peripheral devices in a virtualization environment, the method comprising:
   displaying one or more representations of virtual desktops, the virtual desktops being associated with corresponding virtual machines;
   displaying one or more representations of the peripheral devices based on detection that the peripheral devices are communicatively coupled to a control virtual machine of the virtualization environment, wherein the control virtual machine is configured to control one or more of the virtual machines associated with the one or more representations of the virtual desktops;
   detecting one or more first inputs received with respect to the one or more representations of the virtual desktops and the one or more representations of the peripheral devices; and
   facilitating to establish one or more associations, based on the detected first inputs, between the peripheral devices and the virtual machines, representations of the established associations being displayed on the electronic device.

21. The computer readable storage medium of claim 20, further comprising:
   detecting a second input;
   determining whether the second input corresponds to a pre-configured touch-screen gesture or a pre-configured key combination; and
   providing, based on the determination, to the electronic device to display the one or more representations of the virtual desktop.

22. The computer readable storage medium of claim 20, wherein the one or more first inputs comprises drag-and-drop operations.

23. The computer readable storage medium of claim 20, wherein the representations of the associations are displayed on the user interface as one or more lines connected between the one or more representations of the peripheral devices and the corresponding one or more representations of the virtual desktops.

24. The computer readable storage medium of claim 20, wherein the peripheral devices associated with at least one of the virtual machines are different from the peripheral devices associated with another one of the virtual machines.

25. The computer readable storage medium of claim 20, further comprising instructions that are executable by the one or more processors of the electronic device to cause the electronic device to perform:
   detecting one or more third inputs that are received with respect to representations of the one or more established associations; and
   facilitating to designate the one or more established associations as persisting associations, wherein the persisting associations are re-established or maintained over to a triggering event.

26. The computer readable storage medium of claim 20, further comprising instructions that are executable by the one or more processors of the electronic device to cause the electronic device to perform:
   facilitating to detect an additional peripheral device; and
   displaying the representation of the detected additional peripheral device in a designated area.

27. The computer readable storage medium of claim 20, wherein facilitating to establish the one or more associations between the peripheral devices and the virtual machines comprises:
   facilitating to establish a first association between a first peripheral device and a first virtual machine; and
   facilitating to establish a second association between the first peripheral device and a second virtual machine.

28. An electronic device for managing assignment of peripheral devices in a virtualization environment, the electronic device comprising:
   a touch-screen user interface configured to display one or more representations of virtual desktops, the virtual desktops being associated with corresponding virtual machines;
   one or more processors configured to:
      provide to the touch-screen user interface to display one or more representations of the peripheral devices based on detection that the peripheral devices are communicatively coupled to a control virtual machine of the virtualization environment,
      detect one or more inputs received with respect to the one or more representations of the virtual desktops and the one or more representations of the peripheral devices,
      determine that the detected one or more inputs correspond to a pre-configured touch-screen gesture or a pre-configured key combination, and
      facilitate to establish one or more associations between the peripheral devices and the virtual machines, representations of the established associations being displayed on the touch-screen user interface; and
   a data storage component configured to store the one or more established associations.

29. A method for managing assignment of peripheral devices in a virtualization environment, the method being performed by one or more processors, the method comprising:
   displaying, on an electronic device, one or more representations of virtual desktops, the virtual desktops being associated with corresponding virtual machines;
   displaying one or more representations of the peripheral devices based on detection that the peripheral devices are communicatively coupled to a control virtual machine of the virtualization environment;
   detecting one or more inputs received with respect to the one or more representations of the virtual desktops and the one or more representations of the peripheral devices;
   determining that the detected one or more inputs correspond to a pre-configured touch-screen gesture or a pre-configured key combination; and
   facilitating to establish one or more associations, based on the detected one or more inputs, between the peripheral devices and the virtual machines, representations of the established associations being displayed on the electronic device.

30. A non-transitory computer readable storage medium storing instructions that are executable by one or more processors of an electronic device to cause the electronic device to perform a method for managing assignment of peripheral devices in a virtualization environment, the method comprising:

displaying one or more representations of virtual desktops, the virtual desktops being associated with corresponding virtual machines;

displaying one or more representations of the peripheral devices based on detection that the peripheral devices are communicatively coupled to a control virtual machine of the virtualization environment;

detecting one or more inputs received with respect to the one or more representations of the virtual desktops and the one or more representations of the peripheral devices;

determining that the detected one or more inputs correspond to a pre-configured touch-screen gesture or a pre-configured key combination; and facilitating to establish one or more associations, based on the detected one or more inputs, between the peripheral devices and the virtual machines, representations of the established associations being displayed on the electronic device.

\* \* \* \* \*